(12) United States Patent
Pristup et al.

(10) Patent No.: US 7,191,652 B2
(45) Date of Patent: **\*Mar. 20, 2007**

(54) MAGNETOFLUIDIC ACCELEROMETER WITH PARTIAL FILLING OF CAVITY WITH MAGNETIC FLUID

(75) Inventors: Alexander G. Pristup, Novosibirsk (RU); Yuri I. Romanov, Novosibirsk (RU)

(73) Assignee: Innalabs Technologies, Inc., Dulles, VA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 11/033,513

(22) Filed: Jan. 12, 2005

(65) Prior Publication Data

US 2006/0059991 A1 Mar. 23, 2006
US 2007/0000324 A9 Jan. 4, 2007

Related U.S. Application Data

(63) Continuation-in-part of application No. 10/980,791, filed on Nov. 4, 2004, and a continuation-in-part of application No. 11/006,567, filed on Dec. 8, 2004, now abandoned, and a continuation-in-part of application No. 10/992,289, filed on Nov. 19, 2004, and a continuation-in-part of application No. 11/010,329, filed on Dec. 14, 2004, and a continuation-in-part of application No. 10/836,186, filed on May 3, 2004, now Pat. No. 6,985,134, which is a continuation of application No. 10/209,197, filed on Aug. 1, 2002, now Pat. No. 6,731,268, which is a continuation of application No. 09/511,831, filed on Feb. 24, 2000, now Pat. No. 6,466,200.

(60) Provisional application No. 60/616,849, filed on Oct. 8, 2004, provisional application No. 60/614,415, filed on Sep. 30, 2004, provisional application No. 60/613,723, filed on Sep. 29, 2004, provisional application No. 60/612,227, filed on Sep. 23, 2004.

(51) Int. Cl.
*G01P 3/26* (2006.01)
*G01P 3/42* (2006.01)
*G01P 15/105* (2006.01)

(52) U.S. Cl. .............................. 73/504.08; 73/504.17; 73/504.31

(58) Field of Classification Search .............. 73/514.08
See application file for complete search history.

(56) References Cited

U.S. PATENT DOCUMENTS 4,601,206 A  7/1986  Watson (Continued)

FOREIGN PATENT DOCUMENTS

| JP | 02-205775 | 8/1990 |
| JP | 04-344467 | 12/1992 |
| JP | 06-213921 | 8/1994 |

OTHER PUBLICATIONS

English Translation Abstract for DE 3315958 A1, 1 page, supplied from the esp@cenet database.

(Continued)

*Primary Examiner*—Hezron Williams
*Assistant Examiner*—John C Hanley
(74) *Attorney, Agent, or Firm*—Bardmesser Law Group (57) ABSTRACT

A sensor includes a housing and a magnetic fluid within the housing that incompletely fills the housing. An inertial body is in contact with the magnetic fluid. Displacement of the inertial body relative to the magnetic fluid is indicative of acceleration on the housing. The acceleration includes linear and/or angular acceleration. The inertial body can be an air bubble, or a dissimilar liquid. A plurality of magnets are mounted on the housing, wherein the magnetic fluid is positioned in droplets between the magnets and the inertial body. The magnetic fluid can be a single droplet between each magnet and the inertial body, or multiple droplets between each magnet and the inertial body. The remaining volume in the housing can be filled with a non-magnetic fluid.

17 Claims, 10 Drawing Sheets

U.S. PATENT DOCUMENTS

| | | | |
|---|---|---|---|
| 4,984,463 A | | 1/1991 | Idogaki et al. |
| 4,991,438 A | * | 2/1991 | Evans .................. 73/514.08 |
| 5,181,181 A | | 1/1993 | Glynn |
| 5,774,113 A | | 6/1998 | Barnes |
| 5,780,741 A | * | 7/1998 | Raj ..................... 73/514.08 |
| 5,831,553 A | | 11/1998 | Lenssen et al. |
| 5,835,077 A | | 11/1998 | Dao et al. |
| 5,908,987 A | * | 6/1999 | Raj ..................... 73/514.09 |
| 5,982,169 A | | 11/1999 | Furlani et al. |
| 6,002,184 A | | 12/1999 | Delson et al. |
| 6,128,006 A | | 10/2000 | Rosenberg et al. |
| 6,154,199 A | | 11/2000 | Butler |
| 6,369,794 B1 | | 4/2002 | Sakurai et al. |
| 6,466,200 B1 | | 10/2002 | Anton et al. |
| 6,501,458 B2 | | 12/2002 | Baker et al. |
| 6,509,888 B1 | | 1/2003 | Tuovinen et al. |
| 6,731,268 B2 | | 5/2004 | Anton et al. |
| 2002/0003527 A1 | | 1/2002 | Baker et al. |
| 2002/0054011 A1 | | 5/2002 | Bruneau et al. |
| 2004/0095317 A1 | | 5/2004 | Zhang et al. |
| 2004/0140962 A1 | | 7/2004 | Wang et al. |

OTHER PUBLICATIONS

English Translation Abstract for RU 2201618 C2, 1 page.
English Translation Abstract for RU 2173882 C1, 1 page.
English Translation Abstract for RU 2166203 C1, 1 page.
English Translation Abstract for RU 2168201 C1, 1 page.
Computer Internet Website, Magellan 3D Controller (also known as Space Mouse), by Logicad, a Logitech Company, address "http://qualixdirect.com/html/magellan.html", 2 pages.
Computer Internet Website, "Logitech 3D Mouse Logitech Head Tracker", by Fakespace, Inc., address "http://www.qualixdirect.com/html3d_mouse_and _head_tracker.html", 2 pages.
Computer Internet Website, "The Spaceball 3D Controller", by Spacetec IMC Corporation, address "http://www.qualixdirect.com/html/spaceball.html", 3 pages.
"IEEE Recommended Practice for Precision Centrifuge Testing of Linear Accelerometers", IEEE Standards 836-2001, The Institute of Electrical and Electronics Engineers, Inc., Nov. 7, 2001, pp. i-86.
"IEEE Specification Format Guide and Test Procedure for Two-Degree-of-Freedom Dynamically Tuned Gyros", ANS/IEEE Std 813-1988, The Institute of Electrical and Electronic Engineers, Inc., 1989, pp. i-91.
Bashtovoi, V.G. et al. "Introduction to Thermomechanics of Magnetic Liquids", High Temperature Institute of the Academy of Sciences of the USSR, Moscow, 1985 (partial translation of p. 13).
"IEEE Standard Specification Format Guide and Test Procedure for Nongyroscopic Inertial Angular Sensors: Jerk, Acceleration, Velocity, and Displacement", IEEE Std 671-1985 (R2003), The Institute of Electrical and Electronics Engineers, Inc., 1985, pp. iii-69.

* cited by examiner

MAGNETOFLUIDIC ACCELEROMETER WITH PARTIAL FILLING OF CAVITY WITH MAGNETIC FLUID

CROSS-REFERENCE TO RELATED APPLICATIONS

This application is a continuation-in-part of U.S. patent application Ser. No. 10/980,791, entitled MAGNETOFLUIDIC ACCELEROMETER WITH ACTIVE SUSPENSION, filed Nov. 4, 2004, a continuation-in-part of U.S. patent application Ser. No. 11/006,567, entitled MAGNETOFLUIDIC ACCELEROMETER WITH NON-MAGNETIC FILM ON DRIVE MAGNETS, filed Dec. 8, 2004 now abandoned, a continuation-in-part of U.S. patent application Ser. No. 10/992,289, entitled ACCELEROMETER WITH REAL-TIME CALIBRATION, filed Nov. 19, 2004, a continuation-in-part of U.S. patent application Ser. No. 11/010,329, entitled HOUSING FOR AN ACCELEROMETER USING MAGNETOFLUIDIC EFFECT, filed Dec. 14, 2004, all of which are incorporated by reference herein in their entirety.

This application claims the benefit of U.S. Provisional Patent Application No. 60/616,849, entitled MAGNETOFLUIDIC ACCELEROMETER AND USE OF MAGNETOFLUIDICS FOR OPTICAL COMPONENT JITTER COMPENSATION, Inventors: SUPRUN et al., filed: Oct. 8, 2004; U.S. Provisional Patent Application No. 60/614,415, entitled METHOD OF CALCULATING LINEAR AND ANGULAR ACCELERATION IN A MAGNETOFLUIDIC ACCELEROMETER WITH AN INERTIAL BODY, Inventors: ROMANOV et al., filed: Sep. 30, 2004; U.S. Provisional Patent Application No. 60/613,723, entitled IMPROVED ACCELEROMETER USING MAGNETOFLUIDIC EFFECT, Inventors: SIMONENKO et al., filed: Sep. 29, 2004; and U.S. Provisional Patent Application No. 60/612,227, entitled METHOD OF SUPPRESSION OF ZERO BIAS DRIFT IN ACCELERATION SENSOR, Inventor: Yuri I, ROMANOV, filed: Sep. 23, 2004; which are all incorporated by reference herein in their entirety.

This application is a continuation-in-part of U.S. patent application Ser. No. 10/836,186, filed May 3, 2004 now U.S. Pat. No. 6,985,134, which is a continuation of U.S. patent application Ser. No. 10/209,197 filed on Aug. 1, 2002 now U.S. Pat. No. 6,731,268, which is a continuation of application Ser. No. 09/511,831, filed on Feb. 24, 2000, now U.S. Pat. No. 6,466,200, which claims priority to Russian patent application No. 99122838, filed Nov. 3, 1999, all of which are incorporated herein by reference in their entirety.

BACKGROUND OF THE INVENTION

1. Field of the Invention

The present invention is related to magnetofluidic acceleration sensors.

2. Background Art

Magnetofluidic accelerometers are generally known and described in, e.g., U.S. patent application Ser. No. 10/836,624, filed May 3, 2004, U.S. patent application Ser. No. 10/836,186, filed May 3, 2004, U.S. patent application Ser. No. 10/422,170, filed May 21, 2003, U.S. patent application Ser. No. 10/209,197, filed Aug. 1, 2002 (now U.S. Pat. No. 6,731,268), U.S. patent application Ser. No. 09/511,831, filed Feb. 24, 2000 (now U.S. Pat. No. 6,466,200), and Russian patent application No. 99122838, filed Nov. 3, 1999 that utilize magnetofluidic principles and an inertial body suspended in a magnetic fluid, to measure acceleration. Such an accelerometer often includes a sensor casing (sensor housing, or "vessel"), which is filled with magnetic fluid. An inertial body (inertial object) is suspended in the magnetic fluid. The accelerometer usually includes a number of drive coils (power coils) generating a magnetic field in the magnetic fluid, and a number of measuring coils to detect changes in the magnetic field due to relative motion of the inertial body.

When the power coils are energized and generate a magnetic field, the magnetic fluid attempts to position itself as close to the power coils as possible. This, in effect, results in suspending the inertial body in the approximate geometric center of the housing. When a force is applied to the accelerometer (or to whatever device the accelerometer is mounted on), so as to cause angular or linear acceleration, the inertial body attempts to remain in place. The inertial body therefore "presses" against the magnetic fluid, disturbing it and changing the distribution of the magnetic fields inside the magnetic fluid. This change in the magnetic field distribution is sensed by the measuring coils, and is then converted electronically to values of linear and angular acceleration. Knowing linear and angular acceleration, it is then possible, through straightforward mathematical operations, to calculate linear and angular velocity, and, if necessary, linear and angular position. Phrased another way, the accelerometer provides information about six degrees of freedom—three linear degrees of freedom (x, y, z), and three angular (or rotational) degrees of freedom (angular acceleration $\omega'_x$, $\omega'_y$, $\omega'_z$ about the axes x, y, z).

Generally, the precise characteristics of the acceleration sensor are highly dependent on the geometry of the housing, the inertial body, the arrangements of the magnets, the properties of the magnetic fluid, etc. For a designer, as wide a range as possible of various sensor parameters is desirable. Such parameters include, e.g., dynamic range, sensitivity, response time, physical dimensions, cost, drift, susceptibility to environmental factors, etc. One of the factors that effects the performance of the sensor is hydrodynamic resistance, which results from the inertial body trying to move against the magnetic fluid. Generally, the magnetic fluid is a relatively viscous fluid, and the larger the area of the inertial body in contact with the magnetic fluid, the greater the hydrodynamic resistance. Higher hydrodynamic resistance therefore leads to a lower frequency response.

Accordingly, there is a need in the art for a way to reduce hydrodynamic resistance in a magnetofluidic accelerometer.

BRIEF SUMMARY OF THE INVENTION

The present invention relates to a magnetofluidic accelerometer with partial filling of the cavity with magnetic fluid that substantially obviates one or more of the issues associated with known accelerometers.

More particularly, in an exemplary embodiment of the present invention, a sensor includes a housing and a magnetic fluid within the housing that incompletely fills the housing. An inertial body is in contact with the magnetic fluid. Displacement of the inertial body relative to the magnetic fluid is indicative of acceleration on the housing. The acceleration includes linear and/or angular acceleration. The inertial body can be an air bubble, or a dissimilar liquid. A plurality of magnets are mounted on the housing, wherein the magnetic fluid is positioned in droplets between the magnets and the inertial body. The magnetic fluid can be a single droplet between each magnet and the inertial body, or multiple droplets between each magnet and the inertial body. The remaining volume in the housing can be filled with a non-magnetic fluid.

In another aspect, a sensor includes a magnetic fluid arranged in droplets generally around an inertial body. A second fluid, different from the magnetic fluid, is arranged generally between the magnetic fluid and the inertial body. Displacement of the inertial body relative to the magnetic fluid is indicative of acceleration on the sensor.

In another aspect, a sensor includes an inertial body, and a plurality of droplets of magnetic fluid holding the inertial body in suspension. A plurality of magnetic poles maintain the droplets of the magnetic fluid in contact with the inertial body. Displacement of the inertial body relative to the magnetic fluid is indicative of acceleration on the sensor.

In another aspect, a method for measuring acceleration includes suspending an inertial body using droplets of magnetic fluid; measuring a position of the inertial body in response to a force applied to the inertial body; and calculating acceleration based on the displacement.

In another aspect, a method for measuring acceleration includes suspending an inertial body using droplets of magnetic fluid; generating a magnetic field within the magnetic fluid; modulating the magnetic field to counteract a change in position of the inertial body relative to the droplets of magnetic fluid due to acceleration; and calculating the acceleration based on the modulation.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE FIGURES

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Reference will now be made in detail to embodiments of the present invention, examples of which are illustrated in the accompanying drawings.

FIGS. 1–5 illustrate an exemplary embodiment of a magnetofluidic acceleration sensor of the present invention. The general principles of operation of the magnetofluidic sensor are described in U.S. Pat. No. 6,466,200, which is incorporated herein by reference. The sensor's behavior is generally described by a set of non-linear partial differential equations, see U.S. Provisional Patent Application No. 60/614,415, to which this application claims priority.

Figure 1:
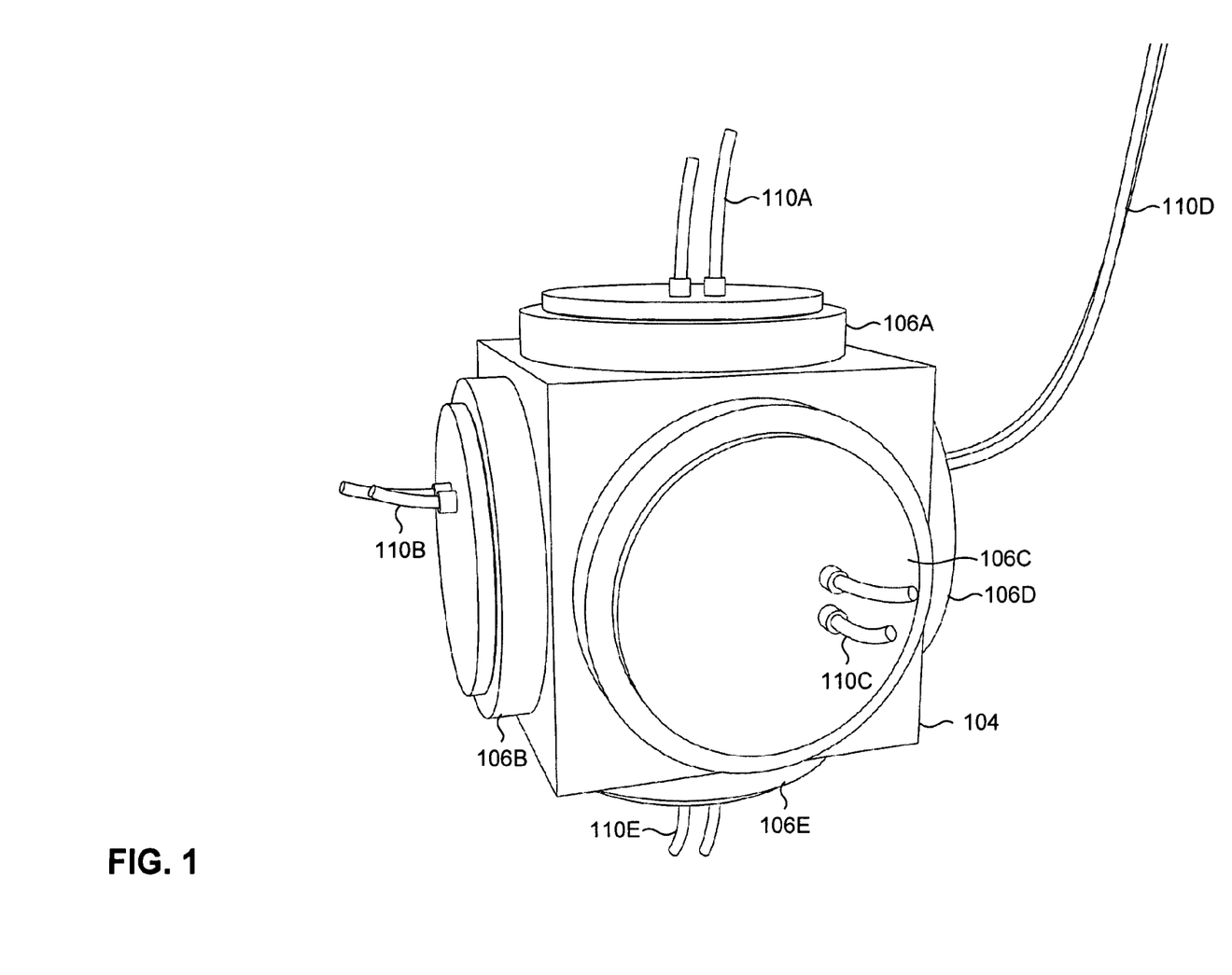
FIG. 1 illustrates an isometric three-dimensional view of an assembled magneto fluidic acceleration sensor of the present invention.
Figure 2:
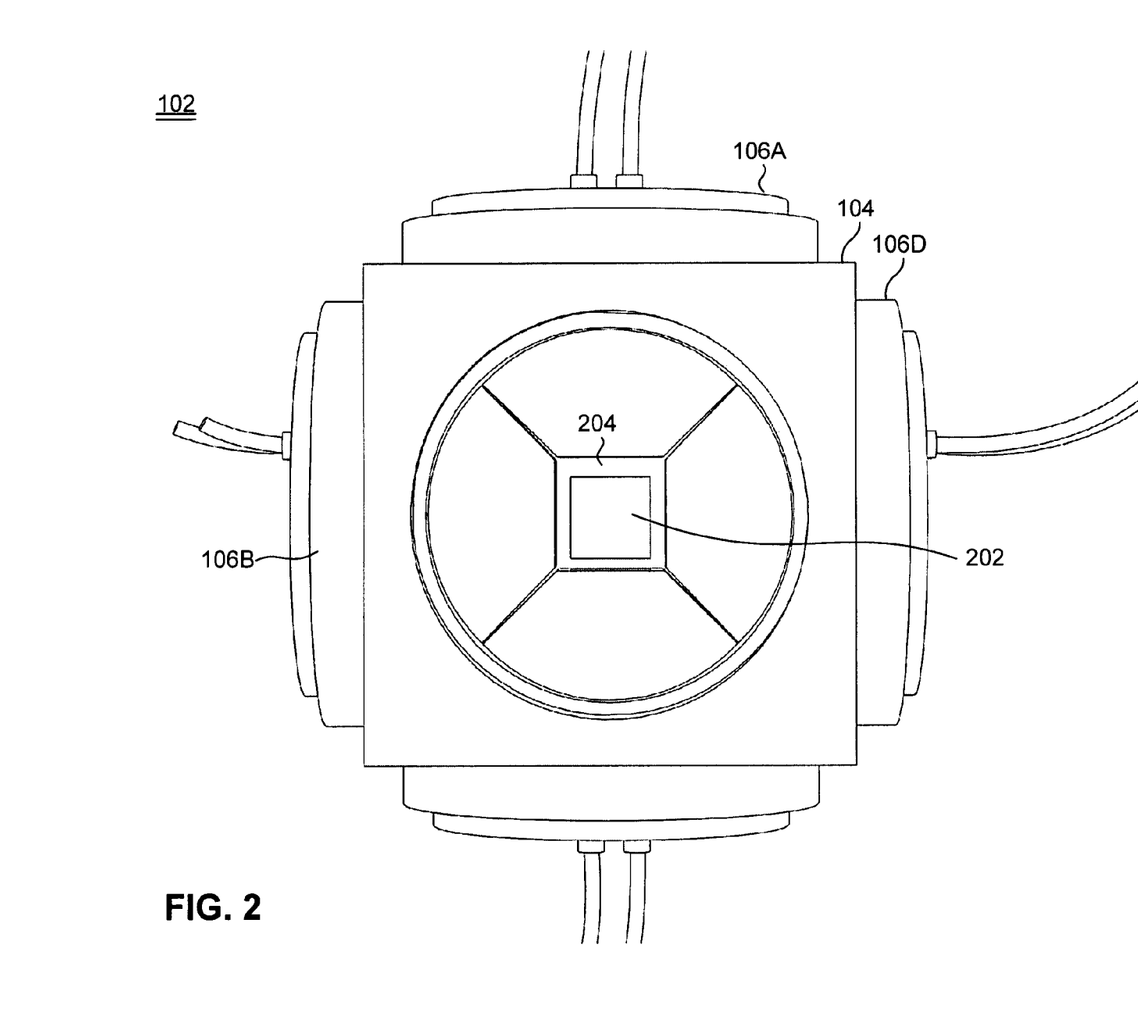
FIG. 2 illustrates a side view of the sensor with one of the drive magnet assemblies removed.

In particular, FIG. 1 illustrates an isometric three-dimensional view of an assembled acceleration sensor. FIG. 2 illustrates a side view of the acceleration sensor with one of the drive magnet casings removed. Note the inertial body in the center.

Figure 3:
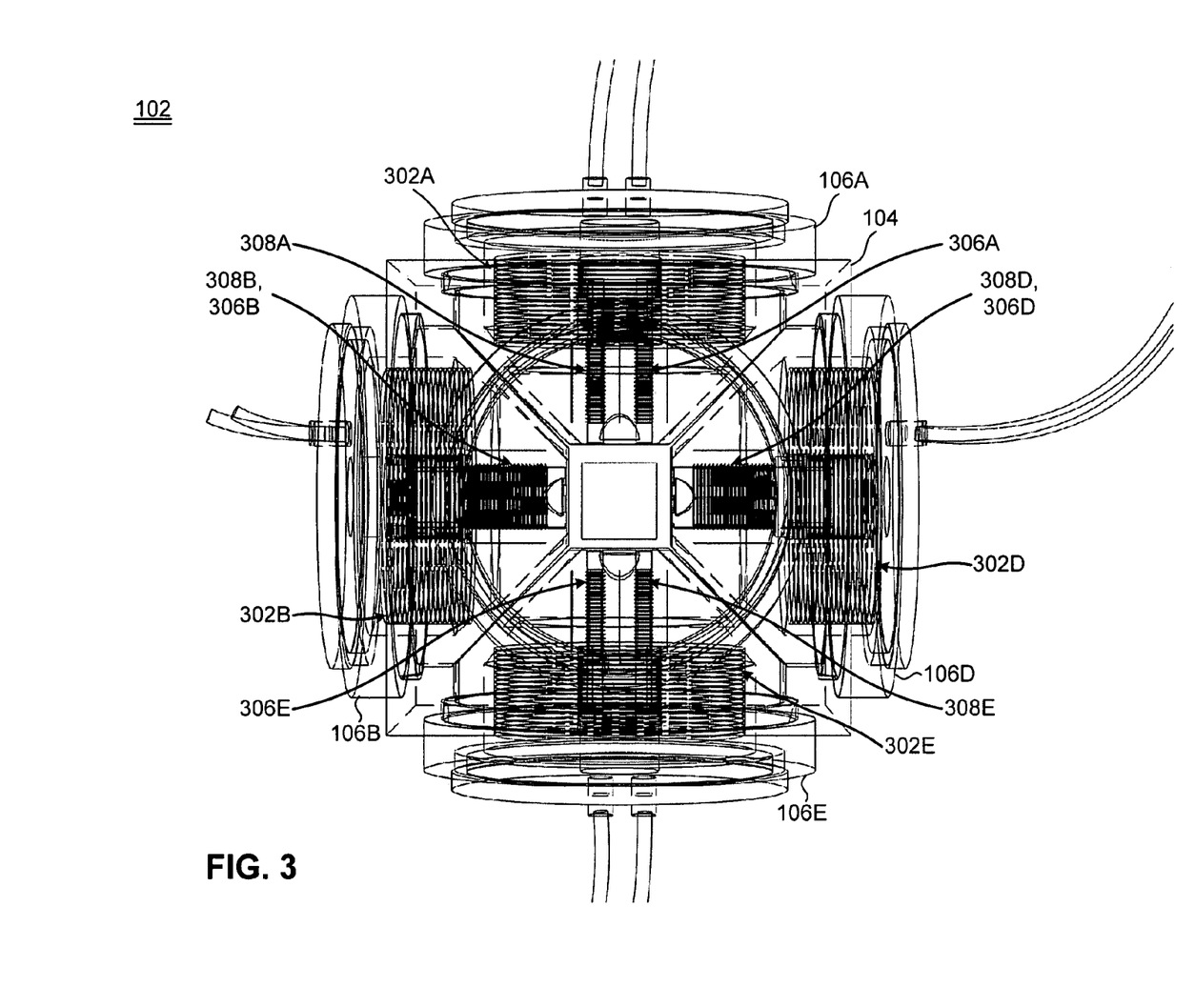
FIG. 3 illustrates a partial cutaway view showing the arrangements of the drive magnet coils and the sensing coils.
Figure 4:
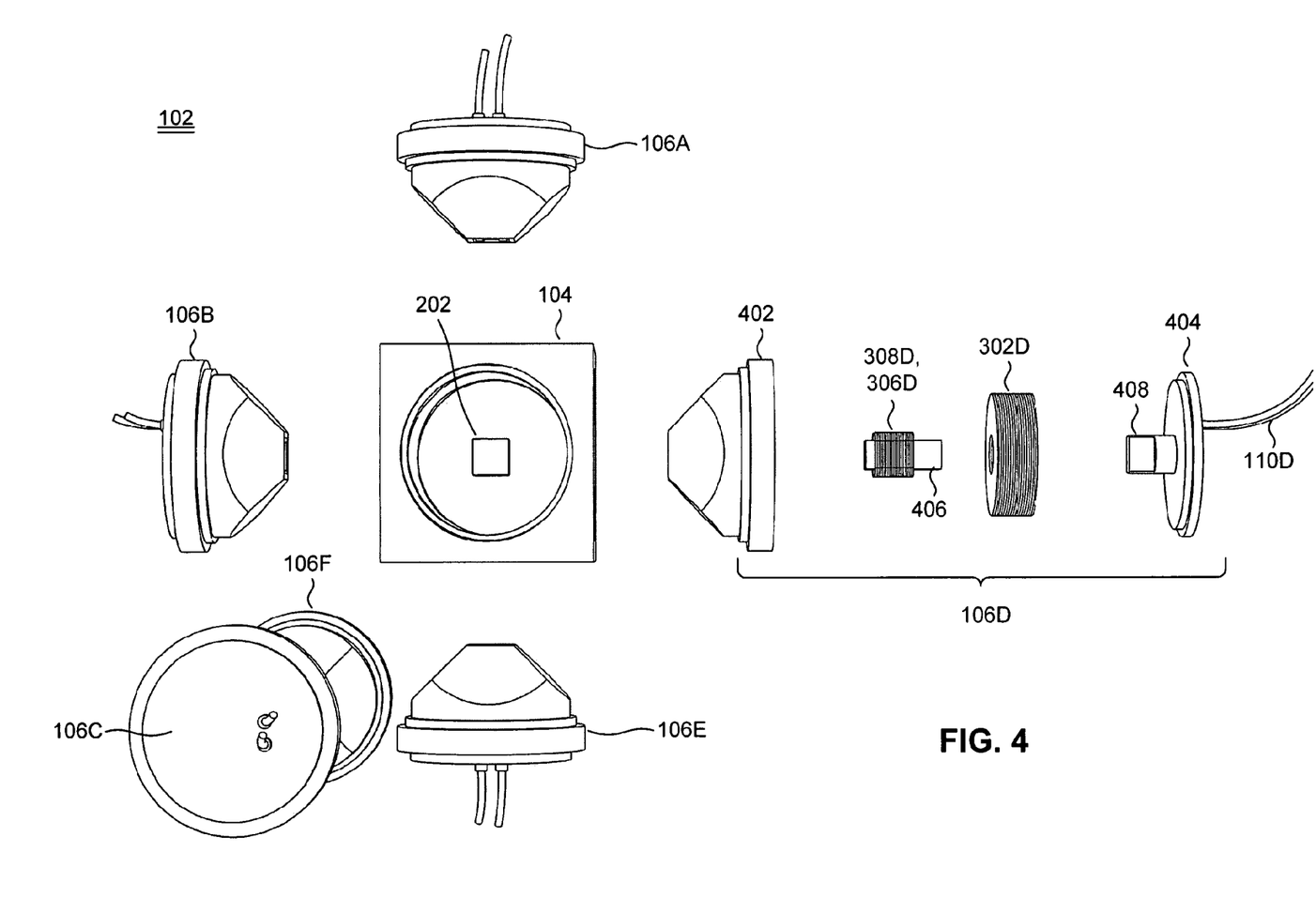
FIG. 4 illustrates an exploded side view of the sensor.
Figure 5:
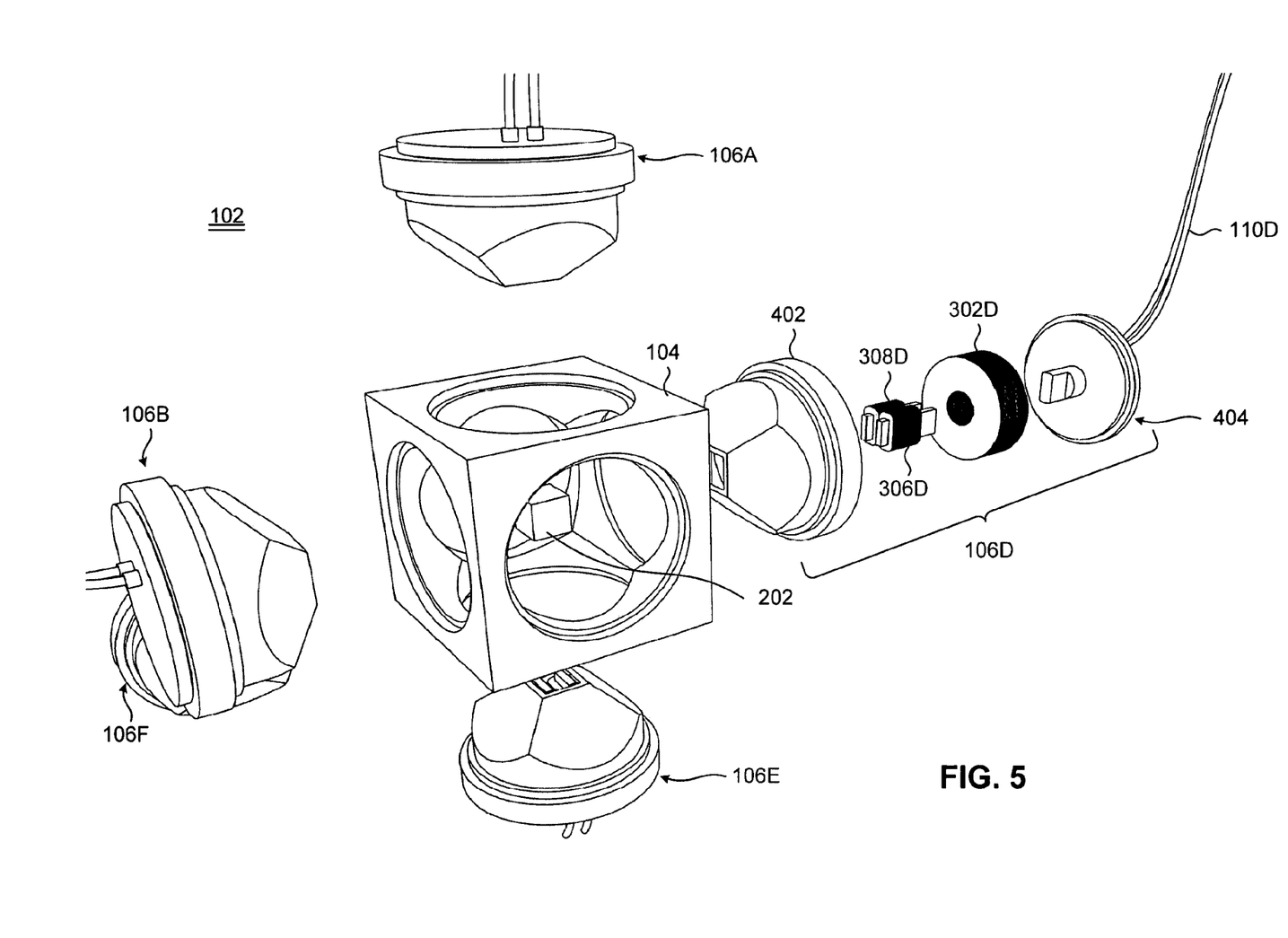
FIG. 5 illustrates a three-dimensional isometric view of the sensor of FIG. 4, but viewed from a different angle.

FIG. 3 illustrates a partial cutaway view showing the arrangements of the drive magnet coils and the sensing coils. FIG. 4 illustrates an exploded side view of the sensor, showing the housing, magnetic fluid inside the housing, and the inertial body surrounded by the magnetic fluid. FIG. 5 illustrates a three-dimensional isometric view of what is shown in FIG. 4, but viewed from a different angle.

Further with reference to FIG. 1, the accelerometer 102, shown in FIG. 1 in assembled form, includes a housing 104, and a number of drive magnet assemblies 106A–106E, each of which is connected to a power source using corresponding wires 110A–110E. Note that in this view, only five drive magnet assemblies 106 are shown, but see FIG. 4, where a sixth drive magnet assembly (designated 106F) is also illustrated.

FIG. 2 illustrates the sensor 102 of FIG. 1, with one of the drive magnet assemblies removed. With the drive magnet assembly 106C removed, an inertial body 202 is visible in an approximate geometric center of the housing 104. The magnetic fluid 204 fills the remainder of the available volume within the housing. Note that the magnetic fluid itself is not actually drawn in the figure for clarity, although most such fluids are black in color and have an "oily" feel to them.

FIG. 3 illustrates a partial cutaway view, showing the sensor 102. Only some of the components are labeled in FIG. 3 for clarity. Shown in FIG. 3 are four drive coils (or drive magnets) 302A, 302B, 302E and 302D, collectively referred to as drive magnets 302 (the remaining two drive magnets are not shown in this figure). The drive magnets 302 are also sometimes referred to as suspension magnets, power magnets, or suspension coils (if electromagnets are used).

In one embodiment, each such drive magnet assembly 106 has two sensing coils, designated by 306 and 308 (in FIG. 3, 306A, 308A, 306B, 308B, 306E, 308E, 306E, 308E). The sensing coils 306, 308 are also sometimes referred to as "sensing magnets", or "measuring coils." Note further that in order to measure both linear and angular acceleration, two sensing coils per side of the "cube" are necessary. If only a single sensing coil were to be positioned in a center of each side of the "cube," measuring angular acceleration would be impossible. As a less preferred alternative, it is possible to use only one sensing coil per side of the cube, but to displace it off center. However, the mathematical analysis becomes considerably more complex in this case.

FIGS. 4 and 5 illustrate "exploded" views of the sensor 102, showing the same structure from two different angles. In particular, shown in FIGS. 4 and 5 is an exploded view of one of the drive magnet assembly 106D. As shown in the figures, the drive magnet assembly 106D includes a casing 402, a rear cap 404, the drive coil 302D, two sensing coils 306D and 308D, magnet cores 406 (one for each sensing coil 306D and 308D), and a drive magnet core 408. In an alternative embodiment, the cores 406 and 408 can be manufactured as a single common piece (in essence, as a single "transformer core").

In this embodiment, the sensing coils 306D and 308D are located inside the drive coil 302D, and the rear cap 404 holds the drive coil 302D and the sensing coils 306D and 308D in place in the drive coil assembly 106D.

The drive magnets 302 are used to keep the inertial body 202 suspended in an approximate geometric center of the housing 104. The sensing coils 306, 308 measure the changes in the magnetic flux within the housing 104. The magnetic fluid 204 attempts to flow to locations where the magnetic field is strongest. This results in a repulsive force against the inertial body 202, which is usually either non-magnetic, or partly magnetic (i.e., less magnetic than the magnetic fluid 204).

The magnetic fluid 203 is highly magnetic, and is attracted to the drive magnets 302. Therefore, by trying to be as close to the drive magnets 302 as possible, the magnetic fluid in effect "pushes out," or repels, the inertial body 202 away from the drive magnets 302. In the case where all the drive magnets 302 are substantially identical, or where all the drive magnets 302 exert a substantially identical force, and the drive magnets 302 are arranged symmetrically about the inertial body 202, the inertial body 202 will tend to be in the geometric center of the housing 104. This effect may be thought of as a repulsive magnetic effect (even though, in reality, the inertial body 202 is not affected by the drive magnets 302 directly, but indirectly, through the magnetic fluid 204).

One example of the magnetic fluid 204 is kerosene with iron oxide ($Fe_3O_4$) particles dissolved in the kerosene. The magnetic fluid 204 is a colloidal suspension. Typical diameter of the $Fe_3O_4$ particles is on the order of 10–20 nanometers (or smaller). The $Fe_3O_4$ particles are generally spherical in shape, and act as the magnetic dipoles when the magnetic field is applied.

More generally, the magnetic fluid 204 can use other ferromagnetic metals, such as cobalt, gadolinium, nickel, dysprosium and iron, their oxides, e.g., $Fe_3O_4$, $FeO_2$, $Fe_2O_3$, as well as such magnetic compounds as manganese zinc ferrite ($Zn_xMn_{1-x}Fe_2O_4$), cobalt ferrites, or other ferromagnetic alloys, oxides and ferrites. Also, water or oil can be used as the base liquid, in addition to kerosene.

Figure 6:
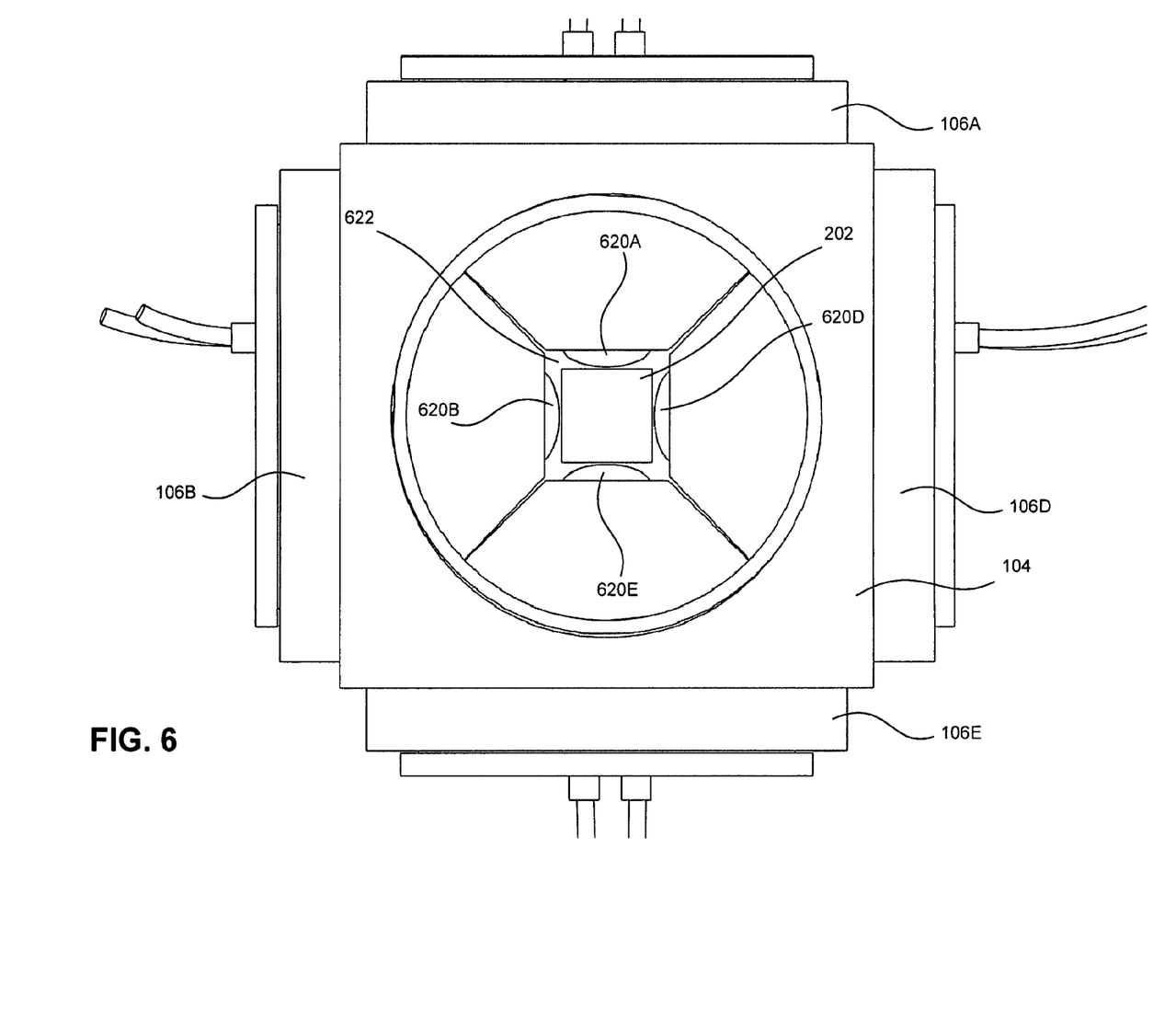
FIG. 6 illustrates one embodiment of the invention that uses a single droplet of magnetic fluid for each drive magnet assembly.
Figure 10:
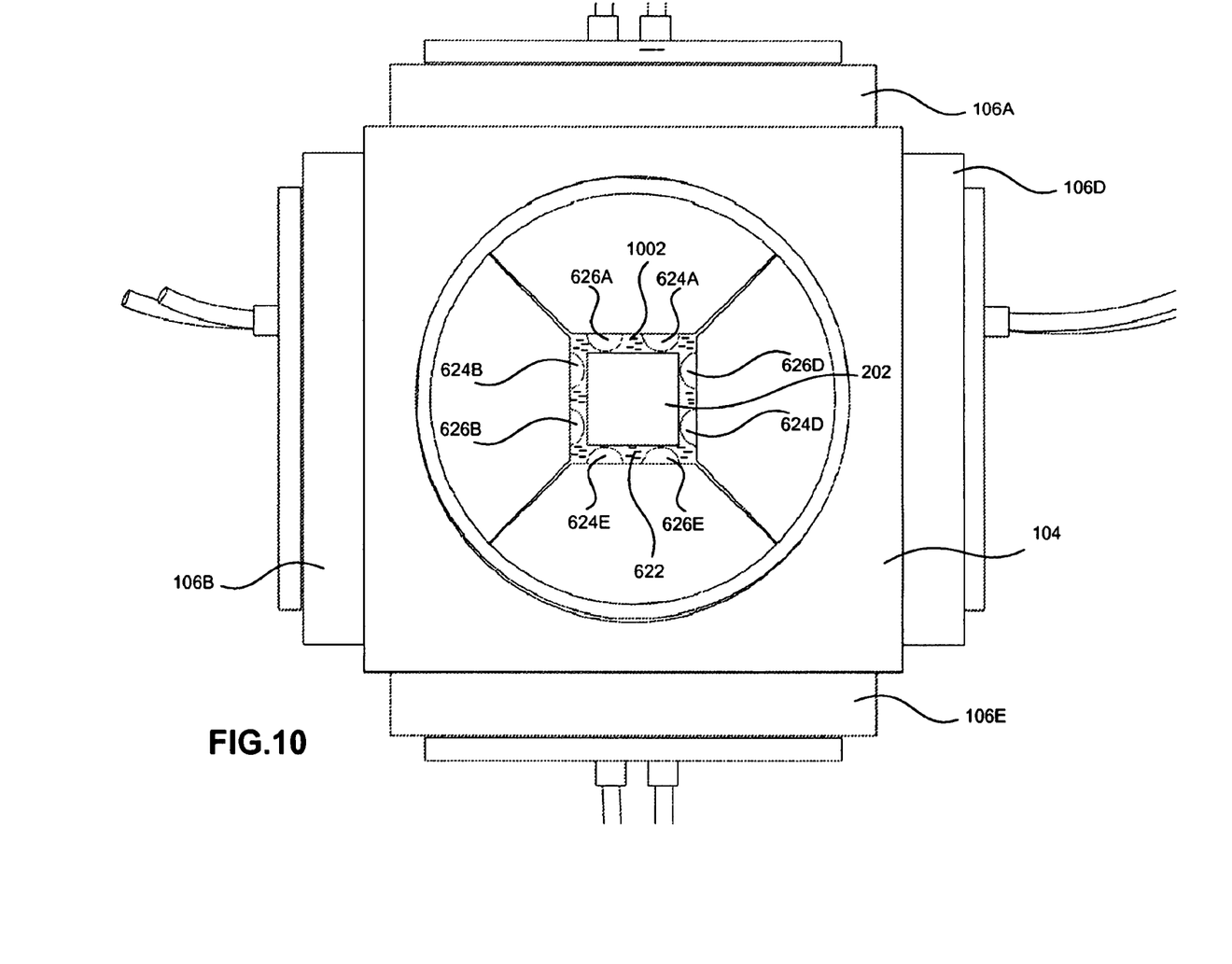
FIG. 10 illustrates the use of dissimilar non-magnetic liquid together with a nonmagnetic body.

FIG. 6 illustrates one embodiment of the present invention. Shown in FIG. 6 is the sensor illustrated in FIGS. 1–5, in cross-sectional view, with droplets of magnetic fluid used to suspend the inertial body 202. Only some of the elements are labeled in FIG. 6 for clarity. As shown in FIG. 6, for each drive magnet assembly 106, a single droplet (labeled 620A, 620D, 620E and 620B in FIG. 6, with four of the six droplets illustrated in the figure). Also, in FIG. 6, the cavity, or "empty space" in which the inertial body 202 is located, is designated by 622. Other than the droplets 620 and the inertial body 202, the cavity 622 can be filled with air or some other gas. Alternatively, the remainder of the volume of the cavity 622 can be filled with a second liquid (see 1002 in FIG. 10). The second liquid is preferably non-magnetic, and such that it does not readily mix with the magnetic fluid.

Figure 9:
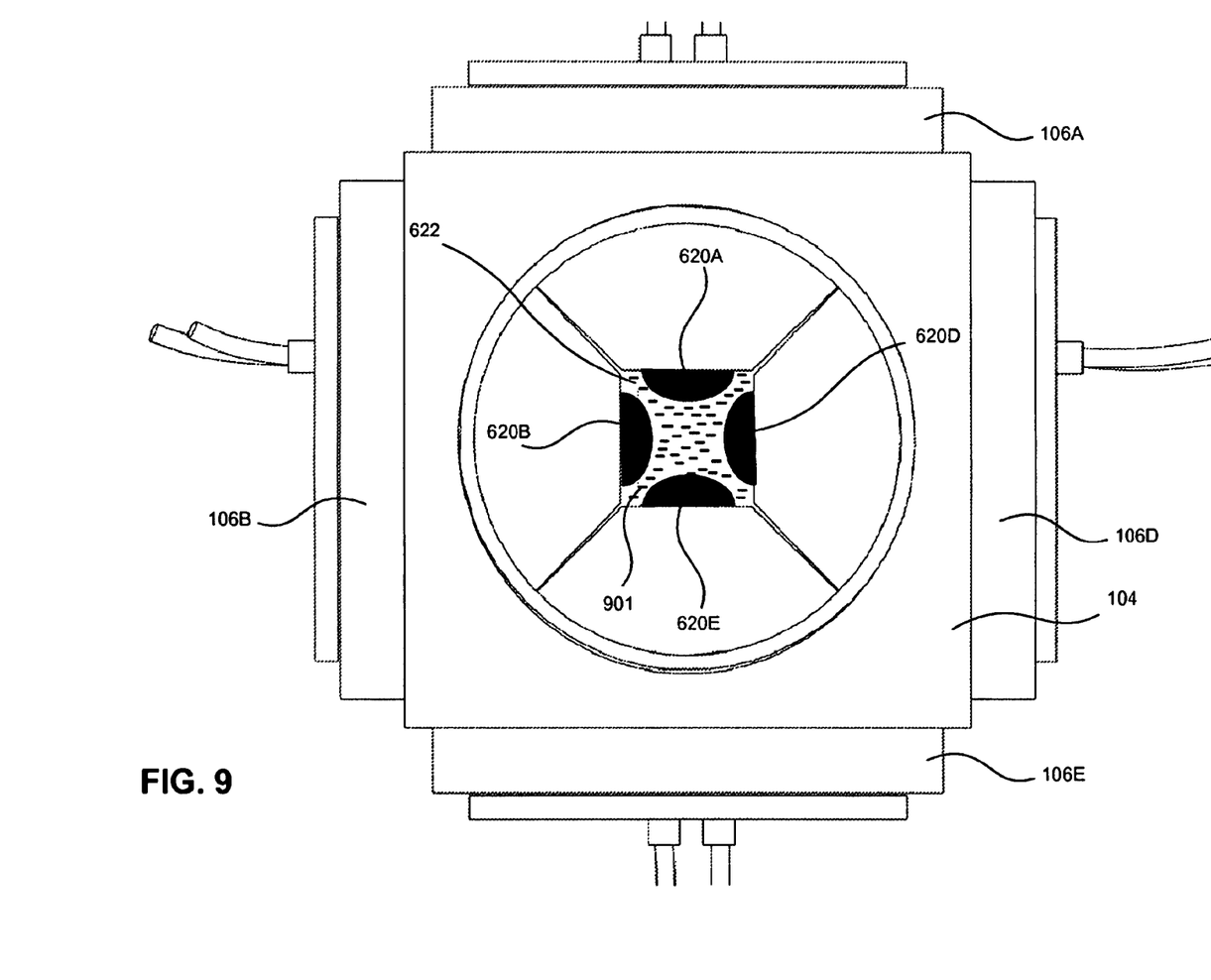
FIG. 9 illustrates the use of dissimilar non-magnetic liquid as an inertial body.

Note further that the second liquid, which is dissimilar to the magnetic fluid, can itself be used as an inertial body (see FIG. 9), rather than a "solid" inertial body shown in FIG. 202. Also, an air bubble can be used as an inertial body (in other words, essentially, the inertial body 202 shown in FIG. 6 is removed, and the sensing coils sense the "sloshing" of the droplets 620 (see 901 in FIG. 9).

Note also that the droplets 620 would have approximately the shape shown in FIG. 6 only when the magnetic field is applied from the drive magnets 302. In the absence of a magnetic field, all the magnetic fluid 204 would "pool" in one of the corners of the cavity 622. It is generally preferred to use either a permanent magnet as the drive magnet 302, or a combination of permanent and electromagnets as the drive magnets 302, particularly for assembly purposes, so as to avoid the possibility of pooling of the magnetic fluid 204, and ensuring that the droplets 620 are formed as shown.

Note also that the magnetic fluid 204 can be a relatively expensive component of the overall sensor 102. Thus, reducing the amount of magnetic fluid 204 used in the sensor 102 is desirable from a cost standpoint. Also, as discussed above, the hydrodynamic resistance depends on the area of contact between the inertial body 202 and the magnetic fluid 204. If the magnetic fluid 204 is arranged in the form of droplets 620, the contact area between the magnetic fluid 204 and the inertial body 202 is reduced, improving the frequency response of the sensor 102.

Figure 7:
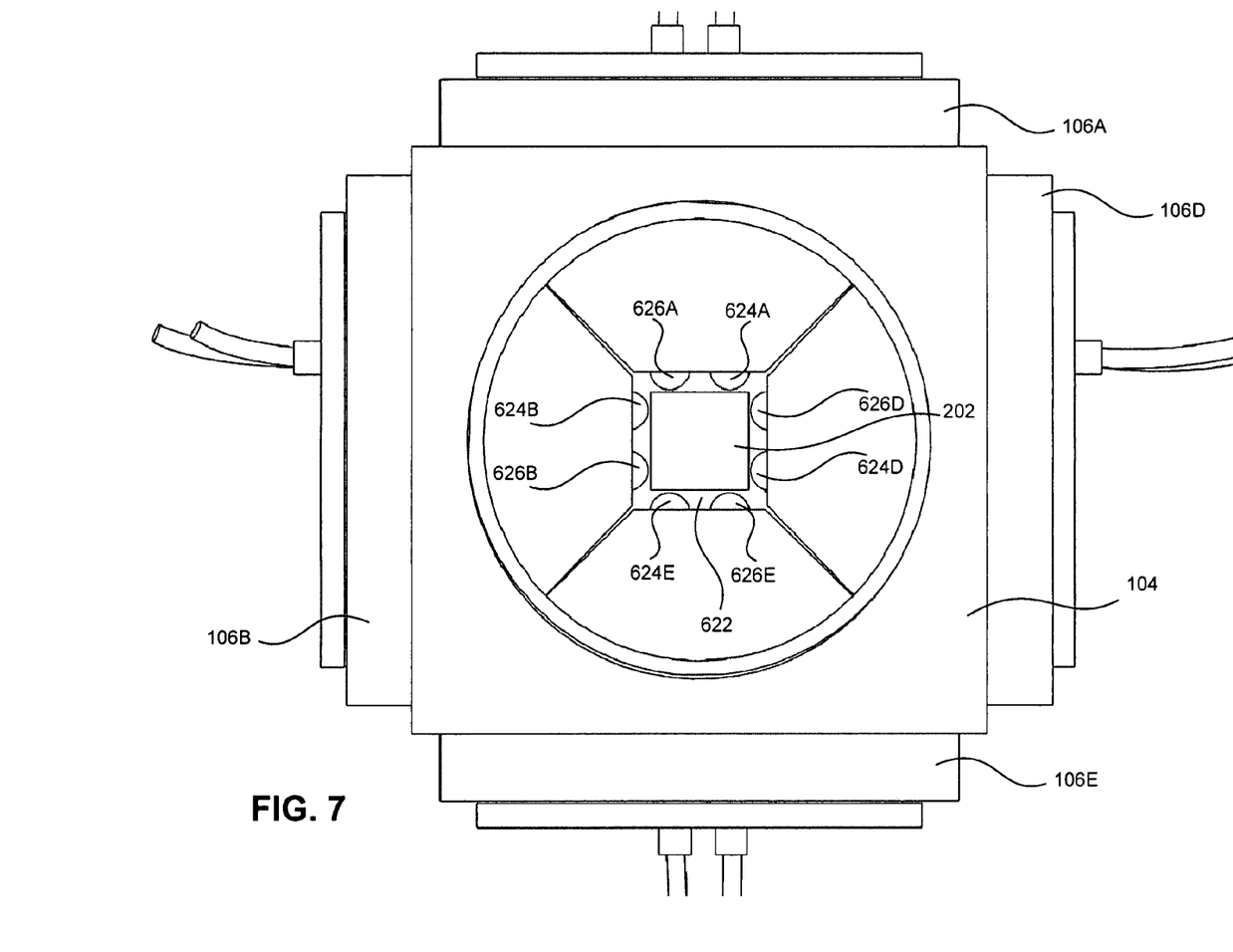
FIG. 7 illustrates an alternative embodiment, where multiple droplets of magnetic fluid are used for each drive magnet assembly.
Figure 8:
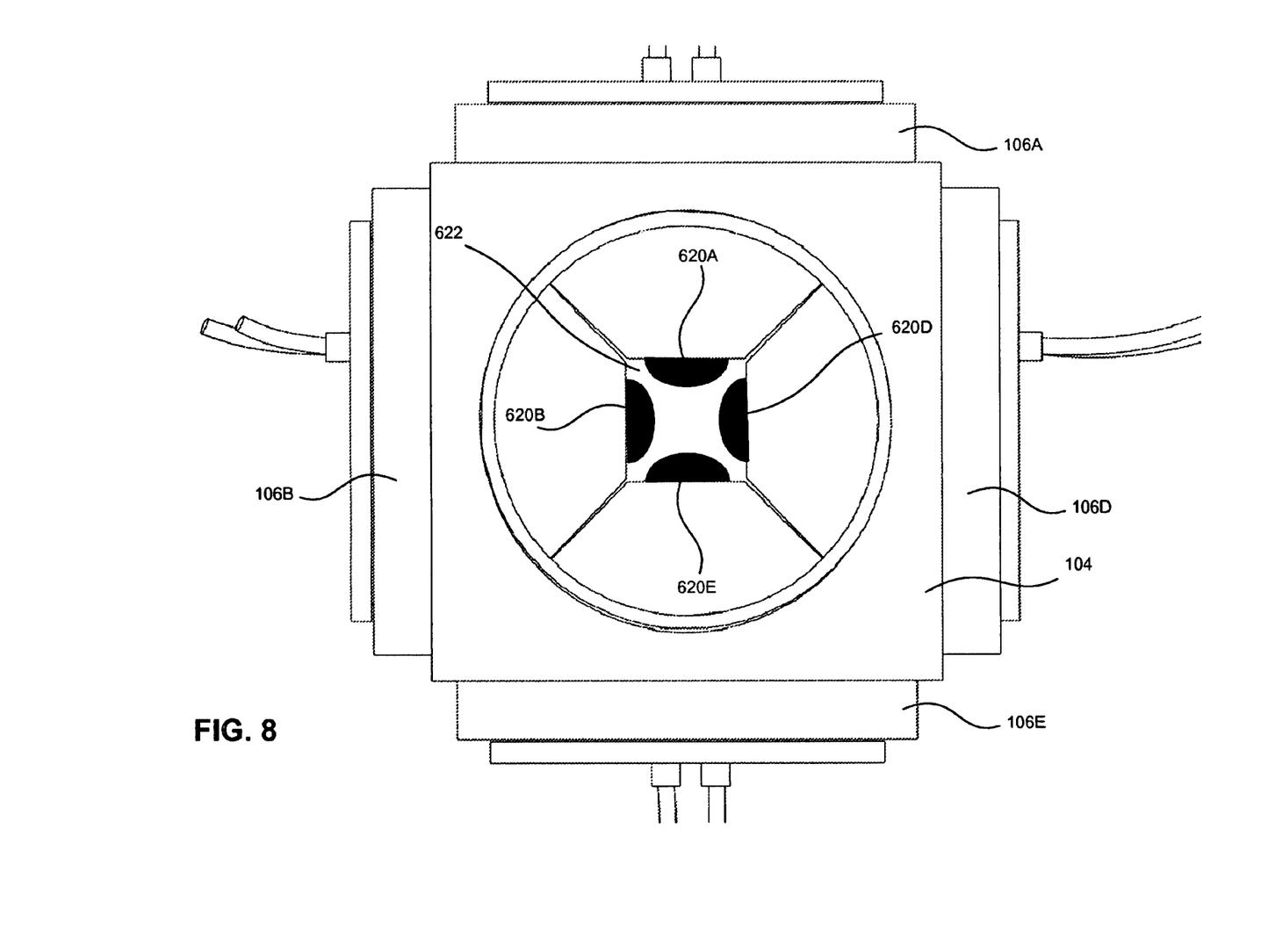
FIG. 8 illustrates the use of an air bubble as an inertial body.

FIG. 7 illustrates another embodiment of the invention, where instead of a single droplet 620, multiple droplets for each drive magnet assembly 106 are used. These droplets are correspondingly labeled 626A, 624A, 626B, 624B, etc. in FIG. 7. Although two droplets per drive magnet assembly 106 are shown in FIG. 7, more such droplets, for example, three or four, may be used for each drive magnet assembly 106, depending on the desired characteristics, the arrangement of the drive magnets 302 and the magnetic field distribution generated by the drive magnets 302. As with FIG. 6, the remaining volume in the cavity 622 can be filled with air, gas, a second liquid, etc.

Having thus described an embodiment of the invention, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A method for detecting acceleration comprising:
   suspending a non-magnetic inertial body using a plurality of separate droplets of magnetic fluid;
   measuring a position of the inertial body in response to a force applied to the inertial body, wherein the change in the position of the inertial body is calculated based on changes of magnetic flux line distribution within the magnetic fluid due to a change in the shape of the droplets; and
   calculating acceleration based on the change in the position of the inertial body.

2. A sensing element of an accelerometer comprising:
   a magnetic fluid arranged in separate droplets in contact with a non-magnetic inertial body;
   at least four magnets surrounding the inertial body, wherein the magnets generate magnetic flux lines within the droplets and maintain the droplets in place;
   a second fluid different from the magnetic fluid arranged in contact with the magnetic fluid and the inertial body, wherein displacement of the inertial body relative to the droplets changes magnetic flux line distribution within the magnetic fluid due to a change in the shape of the droplets, and wherein the change of the magnetic flux line distribution is indicative of acceleration on the sensing element; and a sensor that detects the changes in the magnetic flux distribution.

3. The sensing element of claim 2, further comprising a housing, wherein the plurality of magnets are mounted on the housing, and wherein the droplets are between the magnets and the inertial body.

4. The sensing element of claim 3, wherein the magnetic fluid comprises a single droplet between each magnet and the inertial body.

5. The sensing element of claim 3, wherein the magnetic fluid comprises a plurality of droplets between each magnet and the inertial body.

6. A sensing element of an accelerometer comprising:
a housing;
a magnetic fluid within the housing and having a shape of a plurality of separate droplets, the magnetic fluid incompletely filling the housing such that only an air fills the remaining volume within the housing;
at least four magnets mounted in the housing, wherein the magnets generate magnetic flux lines within the droplets and maintain the droplets in place,
wherein a change in the shape of the droplets due to acceleration changes magnetic flux line distribution within the droplets, and
wherein the change of the magnetic flux line distribution is indicative of acceleration on the housing; and
a sensor that detects the change in the magnetic flux distribution.

7. A sensing element of an accelerometer comprising:
a housing;
a magnetic fluid within the housing and having a shape of a plurality of separate droplets, the magnetic fluid incompletely filling the housing;
a non-magnetic fluid within the housing filling the entire remaining volume within the housing;
at least four magnets mounted in the housing, wherein the magnets generate magnetic flux lines within the droplets and maintain the droplets in place,
wherein a change in the shape of the droplets due to acceleration changes magnetic flux line distribution within the droplets, and
wherein the change of the magnetic flux line distribution is indicative of acceleration on the housing; and
a sensor that detects the changes in the magnetic flux distribution.

8. A sensing element of an accelerometer comprising:
a non-magnetic inertial body;
a plurality of separate droplets of magnetic fluid holding the inertial body in suspension;
at least four magnetic poles surrounding the inertial body and maintaining the droplets of the magnetic fluid in place,
wherein displacement of the inertial body relative to the droplets changes magnetic flux line distribution within the magnetic fluid due to a change in the shape of the droplets, and wherein the change of the magnetic flux line distribution is indicative of acceleration on the sensing element; and
a sensor that detects the changes in the magnetic flux distribution.

9. A sensing element of an accelerometer comprising:
a housing;
a magnetic fluid within the housing and having a shape of a plurality of separate droplets;
a non-magnetic inertial body in contact with the droplets, wherein the magnetic fluid incompletely fills the housing, in addition to a volume occupied by the inertial body;
at least four magnets surrounding the inertial body, wherein the magnets generate magnetic flux lines within the droplets and maintain the droplets in place, and
wherein displacement of the inertial body relative to the droplets changes magnetic flux line distribution within the magnetic fluid due to a change in the shape of the droplets, and wherein the change of the magnetic flux line distribution is indicative of acceleration on the housing; and
a sensor that detects the changes in the magnetic flux distribution.

10. The sensing element of claim 9, wherein the acceleration includes linear acceleration.

11. The sensing element of claim 9, wherein the acceleration includes angular acceleration.

12. The sensing element of claim 9, wherein the inertial body is an air bubble.

13. The sensing element of claim 9, wherein the inertial body is a liquid drop of a liquid dissimilar to the magnetic liquid.

14. The sensing element of claim 9, wherein the magnets are mounted on the housing, wherein the magnetic fluid is positioned in droplets between the magnets and the inertial body.

15. The sensing element of claim 14, wherein magnetic fluid comprises a single droplet between each magnet and the inertial body.

16. The sensing element of claim 14, wherein magnetic fluid comprises a plurality of droplets between each magnet and the inertial body.

17. The sensing element of claim 9, wherein the remaining volume in the housing is filled with a non-magnetic fluid.

* * * * *